Oct. 17, 1961  E. R. CAROLIN  3,004,797
ADJUSTABLE TREAD WHEEL
Filed April 23, 1959  4 Sheets-Sheet 1

INVENTOR.
EDWARD R. CAROLIN
BY
Whittemore, Hulbert & Belknap
ATTORNEYS

Oct. 17, 1961  E. R. CAROLIN  3,004,797
ADJUSTABLE TREAD WHEEL
Filed April 23, 1959  4 Sheets-Sheet 2
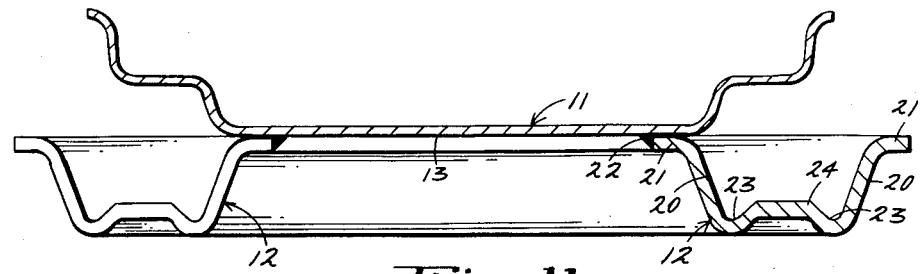
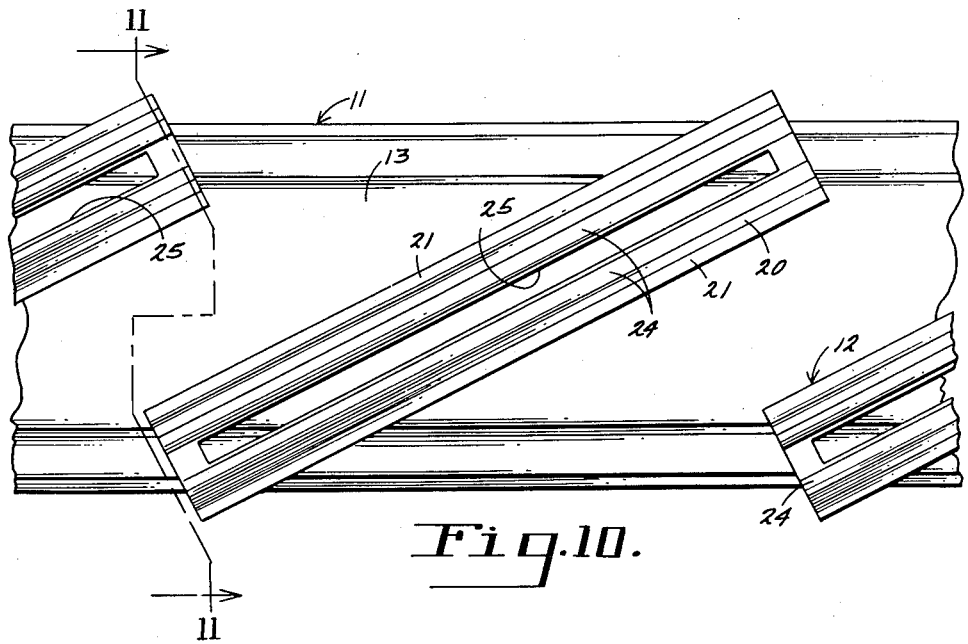
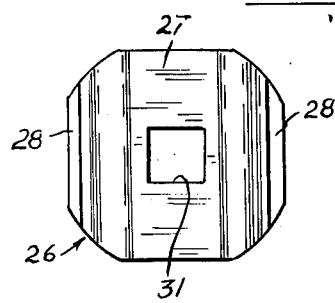
INVENTOR.
EDWARD R. CAROLIN
BY
Whittemore, Hulbert + Belknap
ATTORNEYS Oct. 17, 1961 E. R. CAROLIN 3,004,797
ADJUSTABLE TREAD WHEEL
Filed April 23, 1959 4 Sheets-Sheet 3

INVENTOR.
EDWARD R. CAROLIN
BY
ATTORNEYS

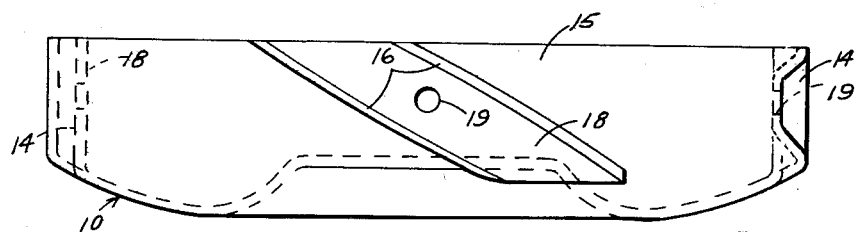
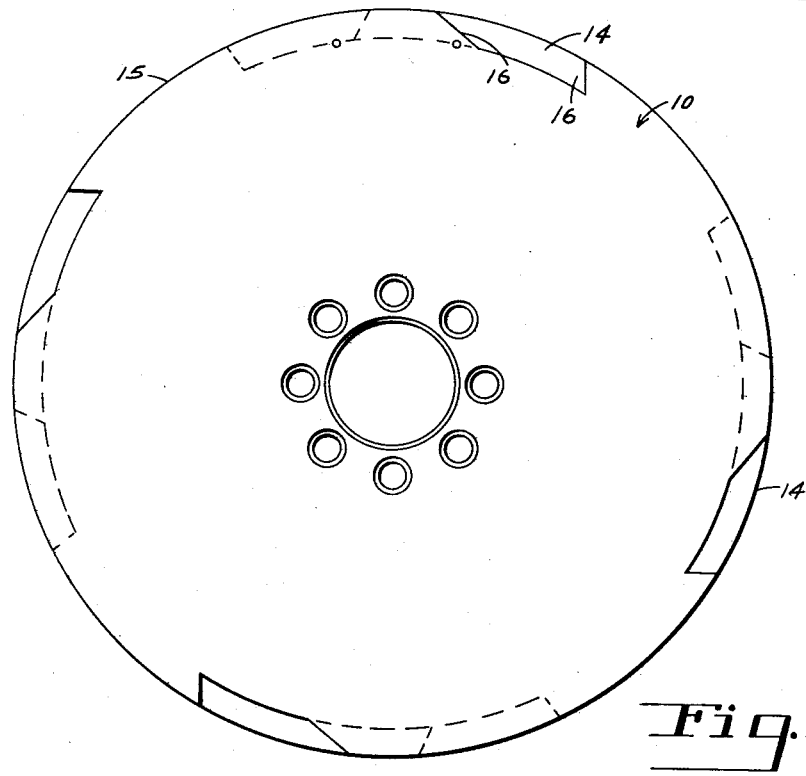

United States Patent Office 3,004,797
Patented Oct. 17, 1961

3,004,797
ADJUSTABLE TREAD WHEEL
Edward R. Carolin, Royal Oak, Mich., assignor to Kelsey-Hayes Company, Detroit, Mich., a corporation of Delaware
Filed Apr. 23, 1959, Ser. No. 808,408
8 Claims. (Cl. 301—9)

This invention relates to wheels and refers more particularly to an adjustable tread wheel for a vehicle such as a tractor, in which it is desirable to adjust the axial spacing of the vehicle wheels.

The invention has for one of its objects to provide an adjustable tread wheel which is strong and rugged, and which is adjustable automatically once the tire rim has been released from clamped relation to the wheel body or disc to permit the adjustment, yet which is extremely simple and inexpensive in construction.

The invention has for another object to provide an adjustable tread wheel in which the wheel body or disc provides all the necessary mounting means for the axially adjustable rim without the need for welded or bolted guide brackets and the like.

The invention has for still another object to provide an adjustable tread wheel in which the wheel body or disc has axially and circumferentially inclined guide means in the form of integral grooves indented in an integral peripheral and axially extending wheel body flange. These grooves receive rails welded to the inner periphery of the rim which are correspondingly axially and circumferentially inclined, the rails having flush engagement with the rim periphery over a substantial arc in the direction of their length. In accordance with the invention, the rails are of hollow cross-section and are mated in the wheel body grooves for longitudinal sliding and camming coaction therewith upon relative rotation of the wheel body and rim, thereby to shift the rim axially for the desired adjustment.

The invention has for a further object to provide an adjustable tread wheel in which the inclined rails on the rim and indented grooves in the wheel body serve the dual function of rotative driving means connecting the rim and wheel body, as well as cam and cam follower means to effect the automatic adjustment of the tread spacing upon relative rotation of the wheel rim and body.

The invention has for a still further object to provide an improved adjustable tread wheel as above described in which the rails and grooves have a resilient, yielding wedging engagement when tightly clamped under pressure so that when the clamping pressure is released the rails and grooves will spring free of each other and thereby facilitate adjustment.

Other objects and features of the invention will become apparent as the description proceeds, especially when taken in conjunction with the accompanying drawings, illustrating a preferred embodiment of the invention, wherein:

FIG. 4 is a plan view of a clamp;

FIG. 6 is an outboard elevational view of the wheel body or disc;

FIG. 9 is a plan view of the rail shown in FIG. 8, indicating the warped character of the rail slot as viewed in plan;

FIG. 10 is a development in plan, as viewed from the inside of the rim, of the rail and rim construction, the closeness of spacing of successive rails being exaggerated; and FIG. 11 is a sectional view on an enlarged scale taken on the line 11—11 of FIG. 10 and rotated 180°.

Figure 1:
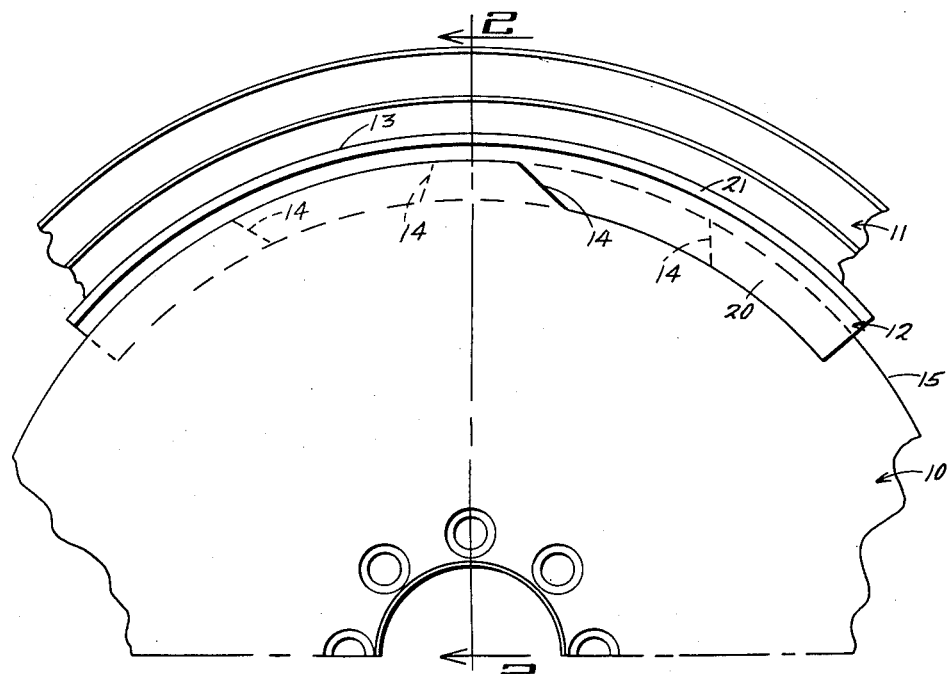
FIG. 1 is a fragmentary elevational view, from the outboard side, of an adjustable tread wheel embodying the invention.
Figure 2:
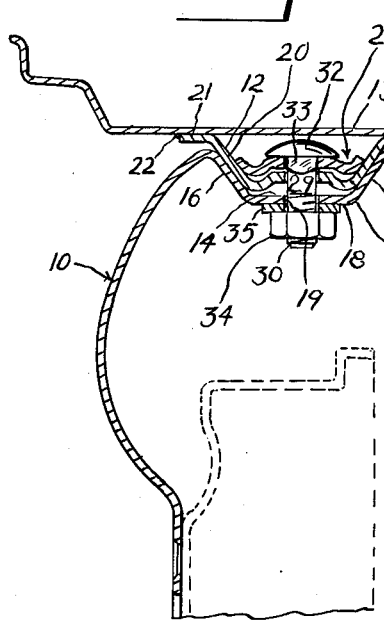
FIG. 2 is a radial sectional view along the line 2—2 of FIG. 1 showing the parts clamped.

The wheel of the invention comprises a wheel body or disc 10 of rugged, heavy duty construction as required for a tractor, a conventional rim 11 and a series of elongated guide or cam follower rails 12 welded to the inner periphery of the base 13 of the rim, preferably in equal circumferential spacing, which rails are slidably received in the elongated inclined camming grooves or channels 14 formed in the same equal circumferential spacing in a peripheral axially inwardly extending flange 15 of the wheel disc 10.

As best illustrated in FIGS. 2, 3, 6 and 7, the grooves 14 are stamped in the flange 15 and are inclined axially and circumferentially at the same angle for adjustment purposes. The grooves are of generally U-shaped cross-section and each is defined by a flat base 18 and the side walls 16 which merge with the base at rounded corners 17 and flare from the base radially outwardly. A bolt receiving hole 19 is formed in the base of each groove at the axial center thereof, in relation to its side walls 16 and approximately at the axial center point of the flange 15. In actual construction involving a wheel body of 24.7" diameter across the flange 15, the inclination of each groove 14 is such that for each 10° of arcuate length of the groove its center line progresses axially a distance of 1.16". This represents an angle of about 60° to the axis of the wheel disc.

The rails 12 are of cross-sectional outline generally similar to that of the respective grooves 14. The rails each have side walls 20 flaring radially outwardly from the base 24 thereof terminating in outwardly spread flanges 21, which have flush engagement with the inner periphery of the rim base 13 and are welded to the latter throughout the rail length, as indicated at 22. The rail side walls merge through the curved corners 23 with the base 24, the base being raised slightly from the curved corners as illustrated. An elongated slot 25 is formed through the base of each rail, terminating short of the opposite ends of the rail. The rails are axially and circumferentially inclined at the same angle as the grooves 14.

Releasable clamping means is provided for clamping each rail in its respective groove under radial pressure and such clamping means includes a generally rectangular clamp 26 within the hollow interior of the rail. The clamp 26 has a central portion 27 and the upturned opposite side edges 28 which are engageable with the side walls 20 of the rails. The side edges 28 flare at the same angle as the side walls 20 of the rails for full surface-to-surface contact therewith. The central portion of the clamp is raised sufficiently to extend clear of the base of the rail so that the latter is free of any clamping pressure. The clamping means also includes a bolt 29 having a shank 30 extending through the slot 25 in the rail and the bolt hole 19 in the groove and also through a square hole 31 in the center of the clamp. The bolt shank has an integral head 32 overlying the clamp within the hollow interior of the rail and its head end is formed square as indicated at 33 to provide a non-rotatable engagement in the clamp hole 31. The clamp 26 is of relatively heavy construction so that the square portion 33 of the bolt shank will not deform the corners of the hole 31 when the nut 34 is tightened. Nut 34 is threaded on the opposite end of the shank to draw the rail tightly into its associated groove. A washer 35 is interposed between the nut and base of the groove.

The wheel disc and flange 15 in which the grooves 14 are stamped is formed of a suitable resilient material such as steel, as are the rails 12. The sides of the rails and grooves flare at the same angle, and since they are formed of a resilient material, they will have a resilient, yielding wedging engagement when drawn together into full surface-to-surface contact by the action of the clamping means. A firm friction engagement is thus obtained to provide the necessary driving torque. The tighter the nut is applied, the stronger and firmer is the yielding wedging frictional engagement. It is noted that when the parts are clamped together (FIG. 2) the base of the rail does not engage the base of the groove so that the rail does not bottom in the groove and hence there is no interference with the wedging engagement. Moreover, the clamp does not engage the base of the rail and hence there is no tendency for the base of the rail to be deformed and bottomed against the base of the groove. Also there is no tendency for the sides of the rail to collapse inwardly and reduce the friction engagement with the grooves, as there would be if clamping pressure were applied directly to the rail base. The clamping pressure is applied to the rail at the sides thereof only due to the configuration of the clamp.

Figure 3:
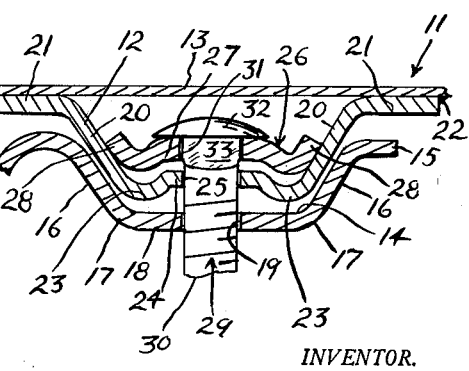
FIG. 3 is similar to FIG. 2 but shows the parts unclamped.

As a result of the clamping pressure applied, the rails are resiliently drawn into the grooves, causing a slight flexing of the sides of the rails toward each other or a slight flexing of the sides of the grooves away from each other, or both. There will also be a slight radially inward flexing of the rim or a slight radially outward flexing of the flange 15, or both. Such flexing does not exceed the elastic limit of the parts however. When the clamping pressure is released by backing off the nut, in preparation for an adjustment of the wheel, the spring tension stored in the rails and grooves and rim and flange is released so that the rails in effect spring free of the grooves as illustrated in FIG. 3. In the normal operation of a vehicle of this kind, mud accumulates and cakes on the grooves and rails effectively freezing the parts together and making adjustment very difficult. Rust may also develop. By virtue of the construction shown, the springing free of the parts when released from clamping pressure effectively breaks up the mud and rust on the parts freeing them for adjustment purposes.

While FIG. 3 shows the rails and grooves actually out of contact, it will be understood that there will be at least some engagement between certain rails and grooves when the wheel is supporting a load.

Figure 5:
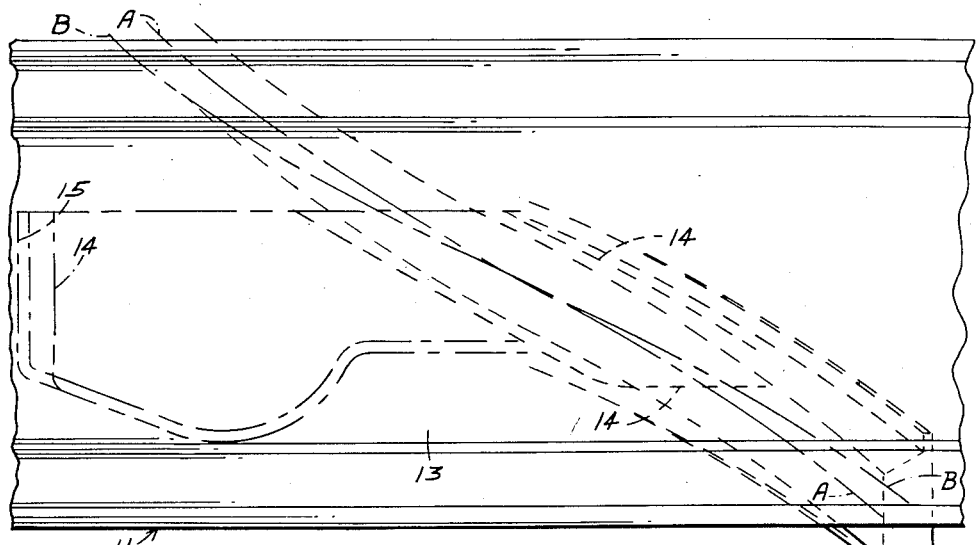
FIG. 5 is a fragmentary semi-diagrammatic plan view illustrating the layout of groove and rail center lines and outlines of the improved wheel, the view being in a radially inward direction.
Figure 7:
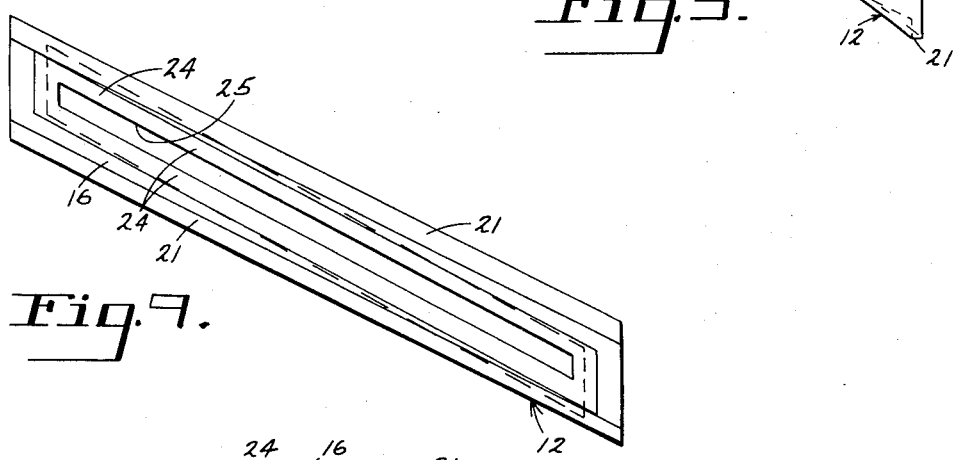
FIG. 7 is a plan view of the wheel body or disc shown in FIG. 6.
Figure 8:
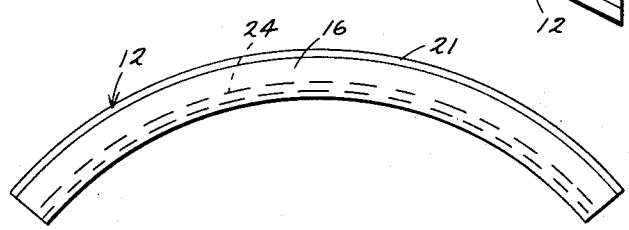
FIG. 8 is an elevational view of a guide rail.

Referring to FIG. 7, the grooves 14 extend from side to side of the wheel body, their inclined lengths opening axially inwardly and outwardly at those sides. The rail 12 is welded flush with the inner rim flange surface throughout its inclined length so that the contour of the rail and its slot 25, like the contour of the groove 14, is warped or non-rectilinear as viewed in plan. Referring to FIG. 5 of the drawings, the center line of the rail slot 25 is designated A—A, while the center line of the wheel flange groove 14 is designated B—B. FIG. 10 is a flat development of the rim and rail construction, as viewed from the inner side of the rim 11.

It is believed that the operation of the improved wheel is apparent from the foregoing description. With the set of clamp nuts 34 loosened, rotation of the wheel body 10 causes the cam grooves to shift the respective rails 12 and rim 11 in one axial direction or the other, the adjustment thus being entirely automatic, other than for the release and reclamping of the bolts and nuts. The construction is an inherently extremely rugged one, and the likelihood of damage to the parts such as would render the arrangement inoperative is practically nil.

The wheel body itself affords all of the necessary provisions to cammingly engage the rim rails, not requiring any additional welded brackets or like parts. Driving stress and camming friction are taken by provisions which are inherently very strong, not subject to damage or destruction under very rough usage. Moreover, the improved wheel is one which can be very inexpensively produced by common and every day methods of fabrication and assembly.

This application is a continuation-in-part of my copending application Serial No. 590,500, filed June 11, 1956, now abandoned.

What I claim as my invention is:

1. An adjustable tread wheel comprising a wheel body, a rim encircling said wheel body in coaxial relation therewith, said wheel body being provided with a plurality of elongated axially and circumferentially inclined radially outwardly opening grooves of generally U-shaped cross-section disposed in spaced relation to one another circumferentially of said wheel body, said rim being provided with a plurality of elongated axially and circumferentially inclined radially inwardly projecting rails of generally U-shaped cross-section slidably received in said respective grooves for axial adjustment of said rim relative to said wheel body upon relative rotation of said rim and wheel body, the sides of said grooves and rails flaring from their bases at the same angle, and releasable clamping means for tightly clamping said rails in said grooves under a radial pressure with the flaring sides of said rails in surface-to-surface engagement with the flaring sides of said grooves to lock said rim on said wheel body in axially adjusted position, said rails and grooves being flexibly resilient and when tightly clamped by said means being deformed to provide a yielding wedging frictional engagement between the flaring sides thereof so that when the clamping pressure is released said rails and grooves will return to their undeformed condition and spring free radially thereby to facilitate adjustment.

2. The adjustable tread wheel defined in claim 1 wherein the bases of said rails are spaced from the bases of said grooves when said rails and grooves are tightly clamped under radial pressure to preclude interference with the aforesaid wedging engagement.

3. The adjustable tread wheel defined in claim 2 wherein said rails are hollow, and said clamping means includes clamps in the hollow interior of said respective rails engageable with the sides only thereof so that the bases of said rails are free of clamping pressure to preclude deformation of said rails.

4. The adjustable tread wheel defined in claim 3 wherein there is provided a bolt for each clamp having a shank extending through the associated clamp, rail and groove and a head at one end of said shank overlying said clamp, each shank having a nonrotating engagement with said clamp, and a nut threaded on the opposite end of each shank.

5. An adjustable tread wheel comprising a wheel body in the form of a disc of one-piece construction, said one-piece disc having a generally radial web and a generally axially inwardly extending annular flange about the periphery of said web shaped to provide a plurality of elongated, axially and circumferentially inclined, radially outwardly opening grooves of generally U-shaped cross-section disposed radially inside the periphery of said web in spaced relation to one another along said flange, said grooves being open at their opposite ends, a rim encircling said disc in coaxial relation therewith and having a plurality of elongated, axially and circumferentially inclined, radially inwardly projecting rails of generally U-shaped cross-section closely slidably received in said respective grooves for axial adjustment of said rim relative to said disc upon relative rotation of said rim and disc, the sides of said grooves and rails flaring from their bases at the same angle, said rails each having a radial opening therethrough, said flange having a radial opening through each groove registering with the opening in the rail received therein, one of each of the registering openings being elongated in the direction of length of said rails and grooves, and releasable clamping means extending through said registering openings for tightly clamping said rails in said grooves under a radial pressure with the flaring sides of said rails in surface-to-surface engagement with the flaring sides of said grooves to lock said rim on said disc in axially adjusted position, said rails and grooves being flexibly resilient and when tightly clamped by said means being deformed to provide a yielding wedging engagement between the flaring sides thereof so that when the clamping pressure is released said rails and grooves will return to their undeformed condition and spring free radially thereby to facilitate adjustment, the bases of said rails being spaced from the bases of said grooves when said rails and grooves are tightly clamped under radial pressure to preclude interference with the aforesaid wedging engagement.

6. The adjustable tread wheel defined in claim 5 wherein said rails are hollow, said clamping means includes clamps in the hollow interior of said respective rails engageable with the sides only thereof so that the bases of said rails are free of clamping pressure to preclude deformation of said rails and resultant contact of the bases of said rails with the bases of said grooves, a bolt for each clamp having a shank extending through the associated clamp and through the registering openings in the associated rail and groove and having a head at one end of said shank overlying said clamp, each shank having a non-rotating engagement with the associated clamp, and a nut threaded on the opposite end of each shank.

7. The adjustable tread wheel defined in claim 6 wherein said clamping means are at the axially inner side of said web and concealed by said disc and rails when said wheel is viewed from the outboard side.

8. An adjustable tread wheel comprising a wheel body member, a rim member encircling said wheel body member in coaxial relation therewith, one of said members being provided with a plurality of elongated, axially and circumferentially inclined radially opening grooves of generally U-shaped cross-section disposed in spaced relation to one another circumferentially of said one member, the other of said members being provided with a plurality of elongated axially and circumferentially inclined radially projecting rails of generally U-shaped cross-section slidably received in said respective grooves for axial adjustment of said rim member relative to said wheel body member upon relative rotation of said members, the sides of said grooves and rails flaring from their bases at the same angle, and releasable clamping means for tightly clamping said rails in said grooves under a radial pressure with the flaring sides of said rails in surface-to-surface engagement with the flaring sides of said grooves to lock said rim member on said wheel body member in axially adjusted position, said rails and grooves being flexibly resilient and when tightly clamped by said means being deformed to provide a yielding wedging frictional engagement between the flaring sides thereof so that when the clamping pressure is released said rails and grooves will return to their undeformed condition and spring free radially thereby to facilitate adjustment.

References Cited in the file of this patent

UNITED STATES PATENTS

| 2,432,385 | Court | Dec. 9, 1947 |

FOREIGN PATENTS

| 563,508 | Great Britain | Aug. 17, 1944 |
| 896,308 | Germany | Nov. 12, 1953 |